Patented Aug. 31, 1954

2,688,040

UNITED STATES PATENT OFFICE 2,688,040

MANUFACTURE OF HYDRAZOBENZENE COMPOUNDS

Rowland K. Adams, New Castle, Del., and William S. Krause, Pitman, N. J., assignors to E. I. du Pont de Nemours & Company, Wilmington, Del., a corporation of Delaware No Drawing. Application February 27, 1952, Serial No. 273,784

4 Claims. (Cl. 260—569)

This invention relates to the manufacture of hydrazobenzene compounds of the general formula

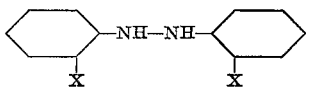

wherein X represents hydrogen, methyl or methoxy. Such compounds are useful for inversion into the corresponding benzidines, which in turn are useful intermediate for dyestuffs and other chemicals.

It is an object of this invention to provide a process which results in improved yields of the desired hydrazobenzene compounds. Various additional improvements and achievements of this invention will become apparent as the description proceeds.

In U. S. Patents 2,233,128, 2,233,129 and 2,233,130, by Henke et al., is described a process for manufacturing hydrazobenzene compounds by hydrogenating nitrobenzene, o-nitrotoluene or o-nitroanisole in an alcoholic medium containing caustic alkali and a palladium catalyst which is usually supported on activated charcoal. This process was found to be much more economical than the zinc-dust-caustic-soda process practiced theretofore, and gave higher yields than a hydrogenation process using a nickel catalyst which had been applied to the production of hydrazobenzene prior to that date.

We have now found, that the yield by the palladium process may be further increased, in all three instances above mentioned, if the alkaline-alcoholic medium employed contains further an alkanolamine and an inert, water-soluble salt. By "inert" we mean that the salt does not contain anions which would be poisonous to the catalyst, for instance sulfides or iodides.

The reason for the observed improvement is not clear to us. It is possible that the added alkanolamine and salt exert some beneficial effect on the longevity of the catalyst. But whatever the theoretical explanation be, we found that the use of such salts jointly with an alkanolamine, for instance mono-, di- or triethanolamine, results in higher yields of the hydrazo compound, and in more uniform yields from batch to batch than obtainable by the said older process.

In some instances, the use of the alkanolamine alone or of the salt alone has been observed to improve the yield, but the joint use of the two results in a much greater improvement and more uniform results from batch to batch.

As illustrations of suitable salts may be mentioned sodium chloride, sodium sulfate, sodium acetate, borax (sodium tetraborate.10H₂O), tetrasodium ethylene-diamine-tetraacetate, sodium phosphate, ferrous sulfate, sodium zincate, and benzyltrimethylammonium chloride. Since the reaction is performed in the presence of sodium hydroxide, the cation of the salt is not critical. But from the viewpoint of simplicity and economy, the preferred salts are sodium chloride, sodium sulfate, sodium acetate and borax.

The quantity of salt effective is generally about 0.5 to 4% based on the weight of the nitrobenzene compound, and the preferred quantity of the ethanolamine is about 0.3% to 2% by weight on the same basis. The quantity of caustic alkali added is of the same order as in the Henke et al. patents above mentioned, that is from 2 to 10%, based on the weight of the nitrobenzene compound. In our process, we prefer to employ this alkali in the form of a 25% to 50% aqueous solution, and the water thus introduced, together with the water formed in the reaction, seems to be sufficient to dissolve the salt added or otherwise to influence it to exert its action on the reaction mass.

Without limiting our invention, the following examples are given to illustrate our preferred mode of operation. Parts mentioned are by weight.

Example 1

240 parts of nitrobenzene, 127 parts of isopropanol, 15 parts of 50% aqueous sodium hydroxide solution, 2.4 parts of borax and 2.4 parts of diethanolamine were agitated in an autoclave. To the mixture was added 1.5 parts of catalyst composed of 3% palladium metal supported on activated charcoal. The autoclave was closed, the charge was heated to 80° C., and hydrogen gas was fed in at an average pressure of 75 p. s. i. gauge while maintaining the reaction mass at a temperature of 80°–85° C. When the absorption of hydrogen ceased, the autoclave was cooled to room temperature.

The amount of hydrazobenzene formed in the reduction was determined by the well known method of inverting hydrazobenzene to benzidine by means of hydrochloric acid and isolating the benzidine hydrochloride. The yield of hydrazobenzene by this procedure was thus found to be about 1.41 times as great as in a control experiment, wherein the above procedure was repeated under identical conditions except omitting the diethanolamine and borax.

Example 2

The procedure and conditions were as in Example 1, except that the borax-diethanolamine combination therein specified was replaced here by 1.2 parts of sodium chloride and 4.8 parts of diethanolamine. The yield of hydrazobenzene, as calculated by the benzidine hydrochloride test, was 1.31 times as great as in the control experiment.

Example 3

The procedure and conditions were as in Example 1, except that the borax-diethanolamine combination therein specified was replaced here by 4.8 parts of sodium acetate trihydrate and 1.2 parts of diethanolamine. The yield was 1.29 times as good as in the control experiment.

Example 4

The procedure and conditions were as in Example 1, except that the borax-diethanolamine combination therein specified was replaced here by 2.4 parts of borax and 2.4 parts of monoethanolamine. The yield was 1.28 times as good as in the control.

Example 5

Repeating once more the procedure of Example 1, except using 2.4 parts of triethanolamine in lieu of the same quantity of diethanolamine therein specified, a yield of hydrazobenzene was obtained which was 1.25 times as good as that in the control experiment mentioned in Example 1.

Example 6

144 parts of o-nitrotoluene, 173 parts of isopropanol, 46 parts of 25% aqueous sodium hydroxide solution, 1.4 parts of borax and 1.4 parts of diethanolamine were agitated in an autoclave. To the mixture was added 0.6 part of catalyst composed of 3% palladium metal supported on activated charcoal. The autoclave was closed, the charge was heated to 80° C. and hydrogen gas was fed in at an average pressure of 75 p. s. i. gauge while maintaining the reaction mass at a temperature of 80°–85° C. When the absorption of hydrogen nearly ceased, 0.3 part of fresh catalyst was added and the hydrogenation was continued. After two more such additions of 0.3 part of catalyst, the absorption of hydrogen stopped abruptly; the autoclave was then cooled to room temperature. The yield of hydrazotoluene was then determined by inverting the reaction product in situ into tolidine hydrochloride, and determining the quantity of the latter by the well-known nitrite process. The yield of hydrazotoluene by this procedure was thus found to be 1.41 times as high as in a control procedure which was run under the same procedure and identical conditions except for omitting the borax and diethanolamine.

Example 7

190 parts of o-nitroanisole, 190 parts of isopropanol, 22.5 parts of 50% sodium hydroxide solution, 2.5 parts of borax and 1.0 part of diethanolamine were agitated in an autoclave. To the mixture was added 1.3 parts of catalyst composed of 3% palladium metal supported on activated carbon. The autoclave was closed, the charge was heated to 60° C., and hydrogen gas was fed in at an average pressure of 150 p. s. i. gauge while maintaining the reaction mass at 60° C.–65° C. When the absorption of hydrogen ceased, the autoclave was cooled to room temperature. The hydrazoanisole in the charge was determined by conversion into dianisidine hydrochloride and determination of the latter by the nitrite absorption method, and the yield was found to be 3 times as high as the yield obtained in a control experiment which was run under identical conditions except for omitting the borax and diethanolamine.

It will be understood that the details of the above examples may be varied within the skill of those engaged in this art.

We claim as our invention:

1. In the process of producing a hydrazobenzene compound by hydrogenating a nitrobenzene compound selected from the group consisting of nitrobenzene, o-nitrotoluene and o-nitroanisole in alcoholic suspension containing further an alkali-metal hydroxide and a palladium-on-carbon catalyst, the improvement which consists of effecting the reaction in the joint presence of an ethanolamine selected from the group consisting of monoethanolamine, diethanolamine and triethanolamine, and of a water-soluble salt selected from the group consisting of sodium chloride, sodium sulfate, sodium acetate and borax.

2. A process as in claim 1, the quantity of said ethanolamine being not less than 0.3% by weight, based on the weight of the nitrobenzene compound, and the quantity of said water-soluble salt being not less than 0.5% by weight on the same basis.

3. A process of preparing a hydrazobenzene, which comprises reacting with hydrogen, under pressure, upon an isopropanol suspension of a nitrobenzene compound of the group consisting of nitrobenzene, o-nitrotoluene and o-nitroanisole, said isopropanol suspension containing a palladium-on-charcoal catalyst, sodium hydroxide and water, and containing further from 0.3 to 2% by weight of an ethanolamine from the group consisting of monoethanolamine, diethanolamine and triethanolamine, and from 0.5 to 4% by weight of a water-soluble salt of the group consisting of sodium chloride, sodium sulfate, sodium acetate and borax, said percentages being based on the weight of said nitrobenzene compound.

4. A process as in claim 3, the reaction being carried out at a temperature not less than 60° C. and not higher than 100° C., and under a gage pressure of between 50 and 200 pounds per square inch.

No references cited.